May 18, 1965   A. J. McKEWAN   3,183,531
METHOD OF FORMING A SCREW WITH CUTTING EDGES
Filed Sept. 26, 1962
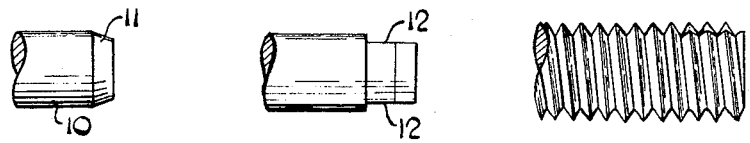
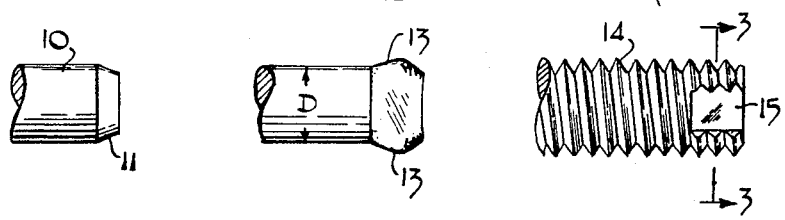
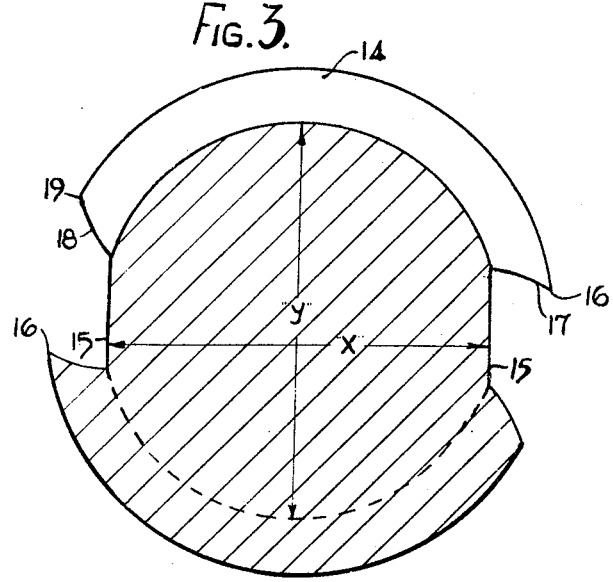
INVENTOR.
ARTHUR JOHN McKEWAN
By Kurt Kelman
agents 3,183,531
METHOD OF FORMING A SCREW WITH
CUTTING EDGES
Arthur J. McKewan, Birmingham, England, assignor to G.K.N. Screw & Fasteners Limited, a company of Great Britain
Filed Sept. 26, 1962, Ser. No. 226,356
Claims priority, application Great Britain, Oct. 4, 1961, 35,712/61
1 Claim. (Cl. 10—10)

This invention relates to screws and the expression "screw" is used herein in the generic sense to cover a fastening member having a shank which is externally threaded for engagement with a complementary fastening member or part which has an internally threaded opening. The internally threaded opening may be in a nut or may be in a hole in some member.

A problem in certain fields is due to the practice of painting components which may have internally threaded holes or may have captive nuts, such painting being carried out before the screws are engaged with the threaded holes or nuts on the component and due to this painting the internal threads in the holes or nuts become clogged with paint, thus rendering difficult the operation of subsequently applying the screws. This is quite an appreciable drawback in mass production techniques, such as motor car production, where any substantial resistance to the rapid insertion of a screw considerably affects the rate of production.

There have been proposals in the past to provide screws especially formed to remove any paint from a nut or other threaded opening and one such proposal involves the machining of grooves in the end of the screw after the thread has been formed, but this entails an expensive additional machining operation. Other prior proposals have involved producing a groove or grooves in the end of a screw whilst the thread is being rolled. This causes a certain thread deformation at the root of the thread which although acceptable in a self-tapping screw which cuts its own thread, would not be acceptable for a screw which is assembled into a pre-tapped component, as it would probably re-cut the thread. These also involve the provision of special die inserts or die forms in the rolling operation and generally speaking all such prior proposals have involved expensive subsidiary operations or expensive modification to the normal screw producing machinery and also can interfere with the production of the desired good thread form at the end of the screw.

An object of the present invention is to provide an improved form of screw which is particularly advantageous in the removing of paint from a nut or other internally threaded opening and which can be produced without substantial increase in the cost of manufacture and also with the desired good thread form at the end of the screw.

According to the invention, a screw is made from a blank having a circular cross-section shank by first pressing two flats at diametrically opposed positions at one end of the blank so as to deform this end portion of the blank to substantially oval form, followed by rolling of a thread upon the blank so as to provide at said end two diametrically opposed positions where the thread is interrupted by a groove and thereby provides the end of the screw with two cutting edges.

Each groove may be of generally straight form and disposed so that it runs parallel to the axis of the shank and having a substantially flat base.

In the case of a screw having a head produced by a heading operation upon the blank, such blank will have a header point on the end remote from the head.

In operating upon a blank by pressing to produce the two flats, the blank is deformed over its end portion to substantially oval form providing two diametrically opposed lobes and when the blank thus deformed is subjected to a normal thread rolling operation between dies, there will be a substantially perfect thread form produced in the two lobes and the metal displaced from each lobe as a result of the rolling will flow in one direction, according to the direction of rolling, into the free space provided by the adjacent flat on the end of the blank and after completion of rolling, this movement of the metal will result in one side of each groove in the blank being constituted by a sharp cutting edge defined by the ends of the threads which will also be undercut somewhat providing appropriate rake to this cutting edge.

The good thread form produced upon the two lobes of the oval end portion of the screw ensures that the screw will make easy entry and good pick up with the internal threads of the nut to which the screw is applied whilst the two cutting edges will ensure that any paint lodged in the threads of the nut will be removed and will escape into the two grooves.

The invention is illustrated in the accompanying drawings wherein:

FIGURE 1, reading from left to right, depicts three stages in the manufacture of a screw showing the final product in the right-hand view.

FIGURE 2 is a plan view of FIGURE 1.

FIGURE 3 is an enlarged cross-section on line 3—3 in FIGURE 2.

Referring to FIGURES 1 and 2, there is first provided a blank 10 of circular cross-section and having at one end the usual form of taper, such blank being produced by any convenient means, for example, forging, and such blank would also be provided with an appropriate head at the end remote from the tapered end 11 in the case where the finished product was to be a headed screw.

The end 11 of such blank is then acted upon in a suitable press wherein dies engage the end of the blank at diametrically opposed positions and compress this end to produce the two diametrically opposed flats 12 as shown in the two centre views of FIGURES 1 and 2.

In the formation of these flats, metal is displaced in opposite directions radially outwardly from the central axis of the blank to form two diametrically opposed raised portions 13 where the transverse dimension at right angles to the axis of the blank, is greater than the initial diameter (D) and these two raised portions ensure the provision of sufficient metal to guarantee a good thread form being produced over the end of the blank during the subsequent thread rolling operation.

The final thread rolling operation is carried out using a normal known type of thread rolling machine and normal rolling dies to produce the final externally threaded screw depicted in the right-hand views of FIGURES 1 and 2 in which the thread form 14 is continued right up to the end of the blank except for the two diametrically opposed positions where the form is interrupted by the two grooves 15 corresponding to the two flats 12 on the initial blank.

Referring now to FIGURE 3, it will be observed that effect of the rolling operation which produces the thread 14 in the area of the flats 12 on the initial blank, is to cause the metal from the raised portions 13 of the initially deformed blank to flow in the direction of rolling so as to produce a full thread form which, because of the tendency of the metal to flow into the gap provided by the flat 12, produces a sharp edge 16 which is undercut by the surface 17 extending away from the edge 16 in the direction opposite to the flow of metal during rolling, thus providing a degree of rake to this cutting edge which in the finished product ensures the complete scouring of any paint from the internal threads of the nut or tapped hole to which the screw is applied.

At the other end of each portion of the thread form 14 bounding the flats 15, the flow of metal during rolling is such as to produce a surface 18 which extends away from the groove 15 sloping radially outwardly in the direction of the flow of metal during rolling so that there is left a groove 15 with substantial clearance between the cutting edge 16 and the opposite edge 19 at the end of the thread at the other side of the groove. This ensures a sufficient width of groove to accommodate any particles of paint scoured away by the cutting edge 16.

Also in the initial operation of pressing the flats 12, the pressing operation is controlled so that the dimension X measured between the flats, is less than the final core diameter Y of the threaded screw so that when the screw is applied to the nut or tapped hole, there will be a definite clearance between the flat base of each groove 15 and the internal thread of the nut or tapped hole so as to ensure two free passages extending axially and along which paint chippings and particles can escape as they are scoured by the cutting action of the edges 16.

The provision of the flats on the end of the blank involves only a simple pressing operation which although it is an additional or secondary operation can be carried out rapidly and quite inexpensively on existing forms of presses utilising automatic feed of the blanks and the rolling operation involves only the use of normal dies and equipment and will provide the desired good thread form on the end of the blank so that the overall cost of production of the screw should not be significantly greater than the cost of production of a normal screw.

Whilst the screw above described has been mentioned as particularly suitable for the removal of paint from nuts and other internally threaded openings by virtue of the provision of cutting edges, this screw can also operate as a self-tapping screw to cut its own thread in a preformed hole and the particular form of screw above described may be found advantageous as a self-tapping screw in certain resinous synthetic materials.

What I then claim is:

Method of making a screw having cutting edges to remove paint from an internal thread with which the screw is engaged, comprising pressing upon a straight elongated metal blank, initially of circular cross-section, in a controlled manner to form two flats at diametrically opposed positions at one end of the blank and separated by a distance which is less than the core diameter of the final threaded screw, by displacing the metal of the blank at these positions so as to cause it to flow away from said positions and form, at this end of the blank, a substantially oval cross-section which has, at the ends of its major diameter, portions of displaced metal which project radially beyond the initial circular cross-section of the blank and which have an excess of metal required to form a thread of full depth at such positions, and then rolling a thread upon the blank including said end of substantially oval cross-section to produce at said end two diametrically opposed portions of thread of full depth equal to the depth of thread on the remaining portion of the screw and two diametrically opposed grooves each of which has a cutting edge along its leading edge.

References Cited by the Examiner

UNITED STATES PATENTS 2,347,360   4/44   Mueuchiuger _____ 85—47

FOREIGN PATENTS 896,037   11/53   Germany.

ANDREW R. JUHASZ, *Primary Examiner.*